Inventor:
Dieter Petzold

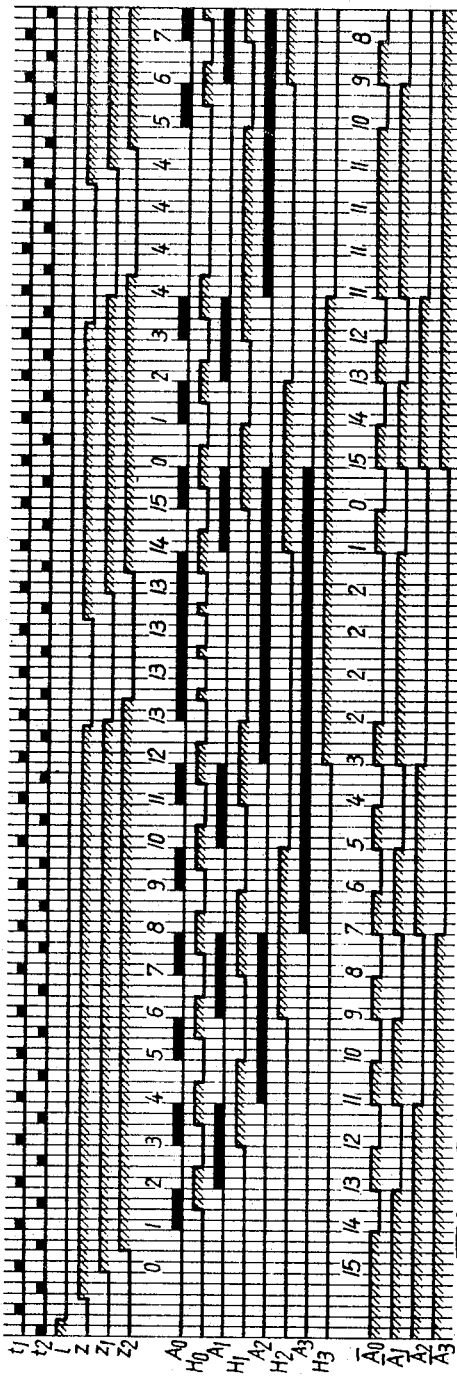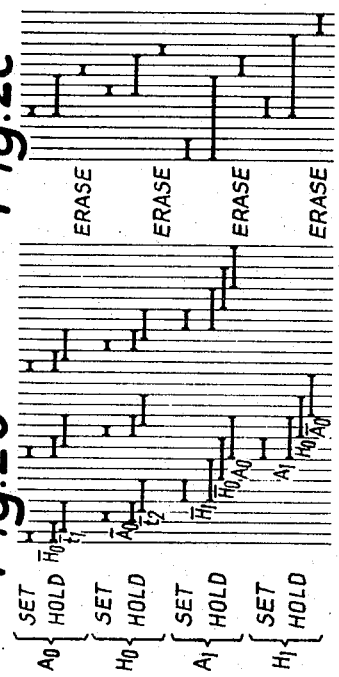

United States Patent Office 3,356,953
Patented Dec. 5, 1967

3,356,953
BIDIRECTIONAL STATIC COUNTER CONTROLLED BY COUNTING SIGNALS AND AUXILIARY COUNTING SIGNALS
Dieter Petzold, Berlin-Neukolln, Germany, assignor to Licentia Patent-Verwaltungs-G.m.b.H., Frankfurt am Main, Germany
Filed Apr. 5, 1965, Ser. No. 445,533
Claims priority, application Germany, Apr. 3, 1964, L 47,479
15 Claims. (Cl. 328—44)

ABSTRACT OF THE DISCLOSURE

A static counter for counting forward or backward and controlled by counting signals and auxiliary counting signals which do not change their state simultaneously. The counter has binary stages each having a main store and an auxiliary store. Each stage except the lowest-order stage is connected to the immediately preceding stage in such a way that the output signal produced by the auxiliary store of each counter stage changes its state in the middle of the output signal produced by the main store of the respective counter stage and in the middle of the time interval between this main store output signal and the subsequent output signal of the main store, and also in such a way that the signals which produce the outputs of each main store and each auxiliary store and which are put out by the input stages of the respective main and auxiliary stores overlap each other.

---

The present invention relates to static counters.

There exist divider stages, such as so-called static flip-flops, each of whose counter stages comprises two stores which are D.C.-connected to each other, the $i_{th}$ stage being controlled by the $(i-1)_{th}$ stage. The counting signals applied are a signal $t$ and its negate $\bar{t}$. Such counters have discontinuities, as a result of which the individual stores may assume incorrect counts.

My copending application Serial No. 327,585, filed Nov. 29, 1963, discloses a static counter which incorporates counter stages each having two memory units, namely, a main storage unit or so-called main store which puts out the signal of the particular digit represented by the counter stage and an auxiliary storage unit or so-called auxiliary store which coacts with the main store. The main and auxiliary stores are controlled by counting signals $t_1$ and auxiliary counting signals $t_2$, there being time intervals between these signals. The signals are applied in parallel to all of the counter stages. Such counters are free of discontinuities, i.e., the individual partial signals produced by the input stages of the stores overlap each other. Here, the input stages are divided into setting and holding stages. A holding stage has the characteristic feature that the output of the store pertaining to this stage is fed back to such stage. The other input stages of this store, namely, the stages to which the output of this store is not fed back, are setting stages.

The output of a store becomes L (L being used to represent the binary "one") when the output of a setting stage is L. The output signal of a store is held at L if the output signal L of the store can be held by a holding stage throughout the time interval during which the setting stage produces a signal L. If a plurality of holding stages are provided, the partial signals produced thereby have to overlap.

In the case of a parallel-controlled counter, no new counting signals and auxiliary counting signals can be applied to the counter prior to the expiration of the time it takes for the various switching steps, triggered by the counting signals and/or auxiliary counting signals, that occur in the counter stages to have run their course. However, the greater the number of counter stages, the longer will be the time required for the running off of all of the logic steps, which, in turn, means that the greater the number of counter stages, the lower will be the maximum counting frequency, because no new counting signals or auxiliary counting signals can be applied while the counting steps, triggered by previous signals, are still going on in the counter.

It is, therefore, the primary object of the present invention to provide a counter arrangement which overcomes the above drawbacks, namely, to provide a D.C.-coupled counter, free of discontinuities, which counter incorporates a plurality of counter stages each having a main store and an auxiliary store and which is controlled by counting signals and auxiliary counting signals which do not change their state simultaneously, but which counter—in contradistinction to the above-described, parallelly controlled counter—can have a new counting signal or auxiliary counting signal applied to it even before the counting steps triggered by a previous counting signal or auxiliary counting signal have completed their run through all of the counter stages. Such a counter can be used to advantage if the counting signals appear at such a high rate that, but for the present invention, the counting and auxiliary counting signals should first be stepped down, e.g., in a divider, and only then applied to a parallelly controlled counter.

With the above objects in view, the present invention resides, basically, in a static counter which is capable of counting forward or backward, which may be equipped with means that allow the counter to be preset to any desired binary number, and which may also be provided with means for converting the counter into a decimal counter, this counter having a plurality of counter stages each incorporating a main store and an auxiliary store and controlled by means of counting signals and auxiliary counting signals which do not change their respective states simultaneously, i.e., a counter as described in the mentioned application Serial No. 327,585. According to the present invention, each $i_{th}$ ($i=1, 2, 3 \ldots$) counter stage that is to say, each counter stage other than the $0_{th}$ of lowest-order counter stage is controlled by the $(i-1)_{th}$ counter stage in such a manner that the output signal produced by an auxiliary store changes its state in the middle of the output signal produced by the corresponding main store and in the middle of the time gap between this output signal of the main store and the subsequent output signal of this main store, and that the signals which produce the output signals of each main and auxiliary store and which are put out by the input stages pertaining to the main and auxiliary stores, overlap each other.

According to a further feature of the present invention, the main and auxiliary stores of the $i^{th}$ counter stages each comprise an input setting stage and three input holding stages. Each of the main and auxiliary stores of the $0^{th}$ stage, if the counter is controlled by counting signals $t_1$ and auxiliary counting signals $t_2$ which appear with time gaps between them, comprises one setting stage and two holding stages; if the counter is controlled by overlapping counting signals $\tau_1$ and auxiliary counting signals $\tau_2$, the main and auxiliary stores of the $0^{th}$ stage each comprises one setting stage and three holding stages. The input holding stages may be replaced by an erasing stage which has a number of inputs equal to the number of replaced input holding stages.

According to a still further feature of the present invention, the main and auxiliary stores of the binary digit $2^0$ will, if the counter has applied to it the counting signals and auxiliary counting signals $t_1$, $t_2$, which have a time gap between them, have the following logic functions:

$$(t_1 \& \overline{H}_0 \& z_2) v (A_0 \& \overline{H}_0 \& \overline{L}) v (A_0 \& \overline{t}_1 \& \overline{L}) = A_0$$

$$(t_2 \& A_0 \& z_2) v (H_0 \& A_0 \& z_2) v (H_0 \& \overline{t}_2 \& z_2) = H_0$$

or, if the applied counting and auxiliary signals $\tau_1$, $\tau_2$, partially overlap each other, the following logic functions:

$$(\tau_1 \& \overline{\tau}_2 \& H_0 \& z_2) v (A_0 \& \overline{H}_0 \& \overline{L}) v (A_0 \& \overline{\tau}_1 \& \overline{L})$$
$$v (A_0 \& \tau_2 \& \overline{L}) = A_0$$

$$(\overline{\tau}_1 \& \tau_2 \& A_0 z_2) v (H_0 \& A_0 \& z_2) v (H_0 \& \overline{z}_2 \& z_2) v (H_0 \& \tau_1 \& z_2) = H_0$$

with the main and auxiliary stores of the subsequent $i^{th}$ stages having the following logic functions:

$$(\overline{A}_{i-1} \& H_{i-1} \& \overline{H}_i) v (A_i \& \overline{H}_i \& \overline{L}) v (A_i \& \overline{H}_{i-1} \& \overline{L}) v$$
$$(A_i \& A_{i-1}) = A_i$$

$$(A_i \& A_{i-1} \& \overline{H}_{i-1}) v (H_i \& A_i) v (H_i \& H_{i-1}) v$$
$$(H_i \& \overline{A}_{i-1} \& \overline{L}) = H_i$$

where $t_1$ = counting signal ⎫
$t_2$ = auxiliary counting signal ⎬ no overlapping.

$z_2$ = clear-for-counting signal $\tau_1$ = counting signal ⎫
$\tau_2$ = auxiliary counting signal ⎬ overlapping.

$A$ = output signal of the main store $H$ = output signal of the auxiliary store $L$ = erase signal $i^{th}$ stage, $i = 2^1, 2^2, 2^3, \ldots$ According to a still further feature of the present invention, the main and auxiliary stores can be converted to have the following logic functions, with $A_0$ and $H_0$ representing the outputs of the main and auxiliary stores of the $2^0$ stage and $A_1$ and $H_1$ the outputs of the main and auxiliary stores of the higher-order stages:

$$\overline{(t_1 \& H_0)} v L v A_0 v \overline{(t_1 \& \overline{H}_0 \& z_2)} = A_0$$

$$\overline{(t_2 \& \overline{A}_0)} v z_2 v H_0 v \overline{(t_2 \& A_0 \& z_2)} = H_0$$

$$\overline{(\overline{A}_{i-1} \& H_{i-1} \& H_i)} v L v A_1 v \overline{(\overline{A}_{i-1} \& H_{i-1} \& \overline{H}_i)} = A_1$$

$$\overline{(\overline{H}_{i-1} \& A_{i-1} \& \overline{A}_i)} v L v H_1 v \overline{(\overline{H}_{i-1} \& A_{i-1} \& A_i)} = H_1$$

According to a still further feature of the present invention, the counter is adapted so as to be susceptible to being pre-set, this being done by providing all main stores, and the auxiliary stores beginning with binary digit $2^2$, with input logic circuits, the logic circuits pertaining to the main stores being controllable by presetting signals $k$ and a common clear-for-presetting signal $f$. The counter stages of such a presettable counter will then have the following functions, with $A_0$ and $H_0$ again representing the outputs of the main and auxiliary stores of the $2^0$ stage and $A_1$ and $H_1$ the outputs of the main and auxiliary stores of the higher-order stages:

$$(t_1 \& \overline{H}_0 \& z_2) v (A_0 \& \overline{H}_0 \& \overline{L}) v (A_0 \& \overline{t}_1 \& \overline{L}) v (f \& k_0) = A_0$$

$$(t_2 \& A_0 \& z_2) v (H_0 \& A_0 \& z_2) v (H_0 \& \overline{t}_2 \& z_2) = H_0$$

$$(\overline{A}_{i-1} \& H_{i-1} \& \overline{H}_i \& z_2) v (A_i \& \overline{H}_i \& \overline{L}) v (A_i \& \overline{H}_{i-1} \& \overline{L}) v$$
$$(A_i \& A_{i-1}) v (f \& k_i) = A_i$$

$$(A_i \& A_{i-1} \& \overline{H}_{i-1}) v (H_i \& A_i) v (H_i \& H_{i-1}) v (H_i \& \overline{A}_{i-1} \& \overline{L}) v$$
$$(f \& A_i \& A_{i-1}) = H_i$$

The element $(f \& A_i \& A_{i-1})$ may be eliminated from the auxiliary store in the binary digit $2^1$.

Additional objects and advantages of the present invention will become apparent upon consideration of the following description when taken in conjunction with the accompanying drawings in which:

FIGURES 2a, 2b and 2c are time plots showing the timed relationship between the various signals used to control the counter of FIGURE 1 and put out by the counter.

In each of the various circuit diagrams, the AND-circuits are identified by "&" (in some cases with subscripts) and the OR-circuits by "v," and in each case the black bar represents the presence of an inverse or complement, i.e., a negated, output. Various ones of the circuits also include pure inverter or so-called NOT-circuits, these being circuits at which the output is the inverse that is to say, the negate, or complement, of the input, namely, 0 when the input is L, and L when the input is 0.

In the time plots, for some of the signals, only the affirmative signals are shown, in the interest of simplicity and clarity. That is to say that, for example, only the signals $t_1$ but not the negates $\bar{t}_1$ thereof, are shown. Also, the signals are shown as having a rectangular wave form although in practice the wave form need not necessarily be square. As a matter of expediency, the abscissa of each signal represents the value 0 while the lines overlying the abscissa represent the binary "one" or L.

Figure 12:
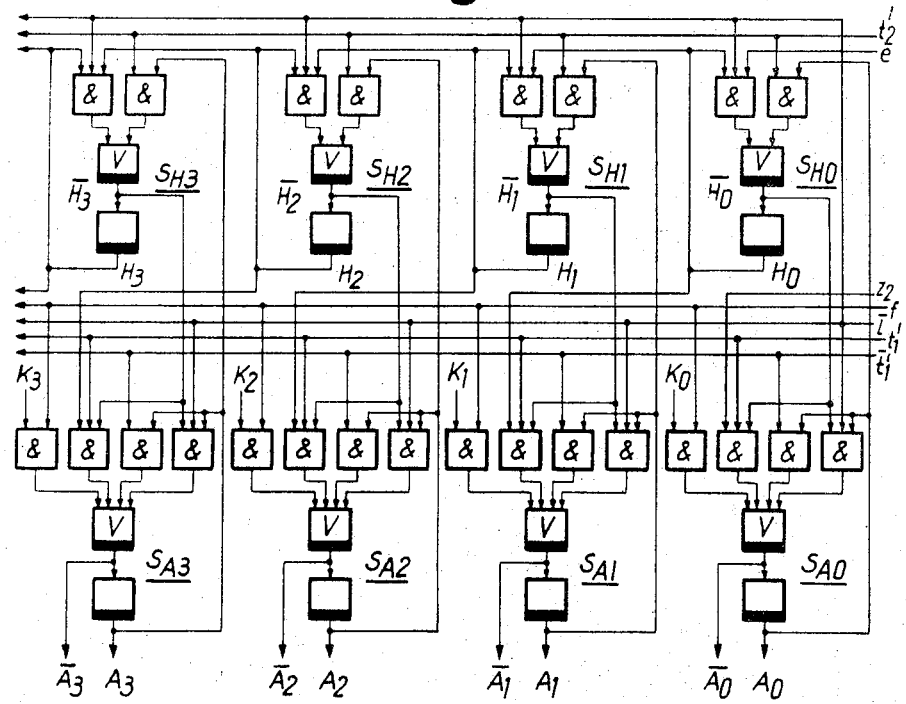
FIGURE 12 is a schematic circuit diagram of a binary counter of the type shown in application Serial No. 327,585, thereby to facilitate the explanation of the present invention.

For purposes of explanation, reference will be made to the static counter shown in application Serial No. 327,585, one embodiment of which is depicted in FIGURE 12 of the accompanying drawings. FIGURE 12 shows the first four counter stages of a binary counter made up of identical counter stages, each incorporating a main store $S_A$ and an auxiliary store $S_H$. Each store is identified by an appropriate subscript, e.g., $S_{A1}$, $S_{H2}$. The stores are constituted by input AND-circuits whose outputs are connected to OR/NOT/NOT-circuits. All of the stores are galvanically coupled to each other. The configuration or wave shape of the applied input signals is of no consequence; all that is necessary is that the input signals have certain predetermined amplitudes.

There will now be described the operation of the counters as well as the significance of the various signals.

Figure 13A:
FIGURES 13a, 13b, 13c and 13d are time plots showing the timed relationship between various signals in the counter of FIGURE 12.
Figure 13B:
Figure 13C:
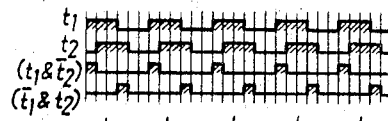
Figure 13D:
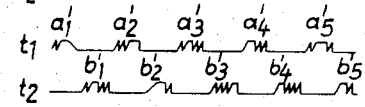

The counter has applied to the actual counting signals $t_1$ as well as auxiliary counting signals $t_2$, the signals $t_1$ and $t_2$ being staggered or time-shifted with respect to each other, i.e., the signals $t_1$ and $t_2$ occur at different times and, as shown graphically in FIGURE 13a, there are time intervals between the signals $t_1$ and $t_2$. The signals themselves, as well as the time intervals therebetween, may be different durations. If the timed relationship between the signals $t_1$ and $t_2$ is as depicted in FIGURE 13b, $t_2$ can be used as the counting signal and $\overline{t_1}$ as the auxiliary counting signal. If the timed relationship between the signals $t_1$ and $t_2$ is as shown in FIGURE 13c, two AND-circuits can be used for producing two signals $(t_1 \& \overline{t_2})$ and $(\overline{t_1} \& t_2)$ which are staggered with respect to each other and between which there is a time interval. The repeated disappearance and reappearance of the $t$-signals—as depicted in FIGURE 13d and as might be produced by shocks or vibrations to which the pulse generator is subjected—will not adversely influence the operation. The signal trains identified in FIGURE 13d at $a'_i$ ($i=1, 2, 3, \ldots$) will each be considered, by the counter, as one counting signal, comparable to the signals $a_1$ of FIGURE 13a. The same applies to the signal trains $b'_i$, each of which will be considered by the counter as an auxiliary counting signal.

The A-signals represent the number of counting signals $t_1$ registered by the counter. The H-signals are auxiliary signals which are formed by the counter itself and which assist the function of the counter. As explained above, the A-signals and H-signals of the binary counter are identified by subscripts. The signal $A_1$ of the binary counter thus has the value $2^1$.

Figures 14A, 14B, 14C, 14D:
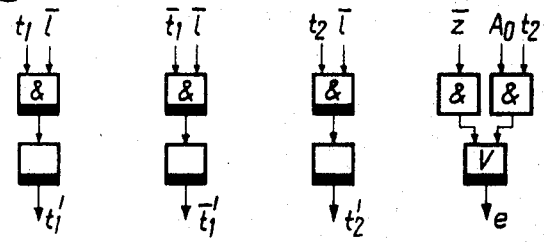
FIGURES 14a, 14b, 14c and 14d are, respectively, schematic circuit diagrams of means for producing signals used in the counter of FIGURE 12.

Before the start of a counting operation, the counter is put into a definite starting position by means of an erase or reset signal $L=L$. During the counting operation, the reset signal $L=0$. For purposes of simplification, those signals which in each counter stage together act on one AND-stage, are separately combined. The counter therefore have applied to them $t'$-signals which are derived from the $t$-signals and the negated reset signal $\overline{L}$ by means of the circuits shown in FIGURES 14a, 14b, 14c. The $e$-signal produced by the circuit of FIGURE 14d is provided solely so that the auxiliary store of the counter stage of the lowest order is constituted by circuitry similar to that of the auxiliary stores of the higher-order counter stages. The circuit shown in FIGURE 14d comprises two input AND-circuits whose outputs are connected to an OR/NOT-circuit. One of the AND-circuits has applied to it the negate of a counting command signal $z$ by means of which the counter is made to count (when $z=L$) or not to count (when $z=0$). (The signal input AND-circuit just referred to, as well as other single-input logic circuits which are part of circuitry referred to throughout the following description, are provided for purposes of electrical symmetry.) The other AND-circuit has applied to it the signals $A_0$ and $t_2$. The signal $z_1$ is derived from the $z$-signal, which may appear at any time, and a signal $z_2$ is derived from the signal $z_1$, such that $z_2$ can change its state only at the start of an auxiliary counting signal $t_2$, as explained in the mentioned application Serial No. 327,585. The signal $z_2$ serves as a clear-for-counting signal, i.e., the $t_1$-signals are counted only so long as $z_2=L$. So long as $z_2=0$, the counter remains at whatever count it has reached. The counter can be preset to any desired starting number by means of preset signals $k$, the same being identified by subscripts and superscripts in a manner analogous to that in which the A and H signals are identified, as explained above. The $k$-signals are accepted by the counter when a clear-for-presetting signal $f=L$. Since the $f$-signal disappears at the start of the counting operation, a new number to which the counter may later be preset can be made ready during the counting operation. If no presetting is required, the means by which the presetting is accomplished can be dispensed with.

Figure 1:
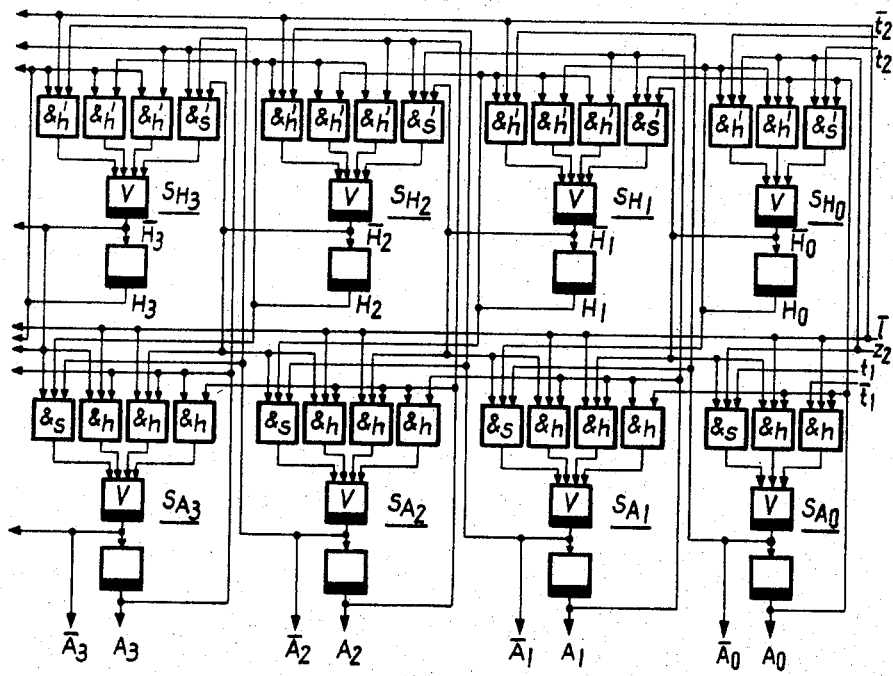
FIGURE 1 is a schematic circuit diagram showing one embodiment of a forward counting counter according to the present invention.

Referring next to FIGURE 1 of the drawings, the same is a schematic circuit diagram of one embodiment of a counter in accordance with the present invention, the same being a forward counting binary counter having, in the illustrated example, four counter stages, each having a main store $S_A$ and an auxiliary store $S_H$. The main and auxiliary stores comprise input AND-circuits $\&$ whose outputs are connected to OR/NOT-circuits $v$ whose outputs are connected to inverter or NOT-circuits, the output of each of the latter being applied to at least one of the input AND-circuits of the respective store. Beginning with the binary digit $2^1$, each of the stores has one setting AND-circuit $\&_s$, $\&_{s'}$, respectively, and three holding AND-circuits $\&_h$, $\&_{h'}$, respectively. The output of each store is applied, in each case, to the holding circuits. The main and auxiliary stores of the lowest-order stage each have one less stage than the main and auxiliary stores of the higher-order stages. The stores of only the lowest-order stage have the counting signals and auxiliary counting signals $t_1$ and $t_2$ applied to them, these counting signals and auxiliary counting signals being staggered and there being time intervals between them, as shown in the time plot of FIGURE 2. Alternatively, the stores of the lowest-order stage can have applied to them overlapping counting signals and auxiliary counting signals $\tau_1$, $\tau_2$, in which case the lowest-order stage will be similar to the higher-order binary stages shown in FIGURE 1. As is apparent from FIGURE 1, the signals for the stages are derived from the main and auxiliary stores of the preceding counter stage.

The counter of FIGURE 1 forms a circuit which operates in accordance with the following logic functions:

$(t_1 \& z_2 \& \overline{H}_0) v (A_0 \& \overline{\overline{L}} \& \overline{H}_0) v (A_0 \& \overline{\overline{L}} \& \overline{t}_1) = A_0$ $(\overline{A}_0 \& H_0 \& \overline{H}_1) v (A_1 \& \overline{\overline{L}} \& \overline{H}_1) v (A_1 \& \overline{\overline{L}} \& \overline{H}_0) v (A_1 \& A_0) = A_1$ $(\overline{A}_1 \& H_1 \& \overline{H}_2) v (A_2 \& \overline{\overline{L}} \& \overline{H}_2) v (A_2 \& \overline{\overline{L}} \& \overline{H}_1) v ((A_2 \& A_1) = A_2$ $(\overline{A}_2 \& H_2 \& \overline{H}_3) v (A_3 \& \overline{\overline{L}} \& \overline{H}_3) v (A_3 \& \overline{\overline{L}} \& \overline{H}_2) v (A_3 \& A_2) = A_3$ $(A_0 \& t_2 \& z_2) v (H_0 \& z_2 \& \overline{t}_2) v (H_0 \& A_0 \& z_2) = H_0$ $(A_1 \& A_0 \& \overline{H}_0) v (H_1 \& A_1) v (H_1 \& H_0) v (H_1 \& \overline{\overline{L}} \& \overline{A}_0) = H_1$ $(A_2 \& A_1 \& \overline{H}_1) v (H_2 \& A_2) v (H_2 \& H_1) v (H_2 \& \overline{\overline{L}} \& \overline{A}_1) = H_2$ $(A_3 \& A_2 \& \overline{H}_2) v (H_3 \& A_3) v (H_3 \& H_2) v (H_3 \& \overline{\overline{L}} \& \overline{A}_2) = H_3$ where $A=$output signals of the main stores
$\overline{H}=$output signals of the auxiliary stores
$\overline{t}_1=$counting signals
$t_2=$auxiliary counting signals
$z_2=$clear-for-counting signals
$L=$erase signal.

Figure 11:
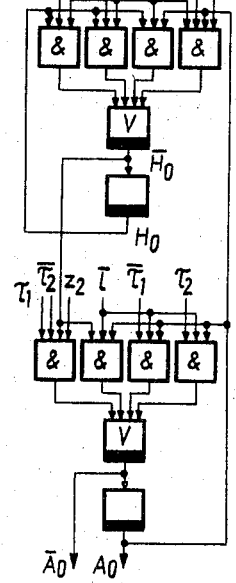
FIGURE 11 is a schematic circuit diagram showing the lowest-order counter stage which is suitable for use when the counter is controlled by overlapping counting signals and auxiliary counting signals.

FIGURES 2a and 2b are time plots showing the operation of the counter of FIGURE 1. The right-hand portion of FIGURE 2a of the time plot shows two interruptions in the counting operation ($z=0$). If the signals $t_1$ and $t_2$ are used for controlling the lowest-order stage, the same will have only two holding conditions, while if overlapping signals $\tau_1$, $\tau_2$, are applied to the lowest-order counter stage, the same will have three holding conditions. The circuity of the lowest-order counter stage suitable for use with overlapping signals $\tau_1$, $\tau_2$, is shown in FIGURE 11, and such a circuit arrangement will operate in accordance with the following logic functions:

$(\overline{\tau_1} \& \overline{\tau}_2 \& \overline{H}_0 \& z_2) v (A_0 \& \overline{H}_0 \& \overline{L}) v (A_0 \& \overline{\tau}_1 \& \overline{L}) v (A_0 \& \tau_2 \& \overline{L} = A_0$ $(\overline{\tau_1} \& \tau_2 \& A_0 \& z_2) v (H_0 \& A_0 \& z_2) v (H_0 \& \overline{\tau}_2 \& z_2)$ $v (H_0 \& \tau_1 \& z_2) = H_0$ In FIGURE 2a, the A-signals represent the output signals of the main stores while the H-signals represent the output signals of the auxiliary stores. The purpose of the H-signals is to distinguish between the leading and trailing flanks of the A-signals. At the instants at which the A-signals appear, the H-signals are, for example, 0, and at the instants at which the A-signals disappear the H-signals are L. According to the present invention, the H-signals change their state precisely in the middle of the A-signals and, subject to the exception noted below, in connection with the decimal counter which will be described in conjunction with FIGURE 9, also precisely in the middle of the time interval between two A-signals. The A-signals and H-signals are put out by stores which have logic input circuits at whose outputs overlapping signals will appear. It is this appearance of the H-signals in conjunction with the generation thereof from overlapping partial signals which is the salient feature of the counter according to the present invention. The A-signals will double their duration, from stage to stage. The same applies to the H-signals. The lower part of FIGURE 2a shows the signals which appear at the outputs $\overline{A}$ of the main stores. These output signals represent a backward counting as the time plot shows.

FIGURE 2b shows how the signals A and H are combined from the partial signals, the time plots showing the output signals of the setting and the three holding stages. It will thus be seen that the A and H signals are free of any discontinuities.

Figure 3:
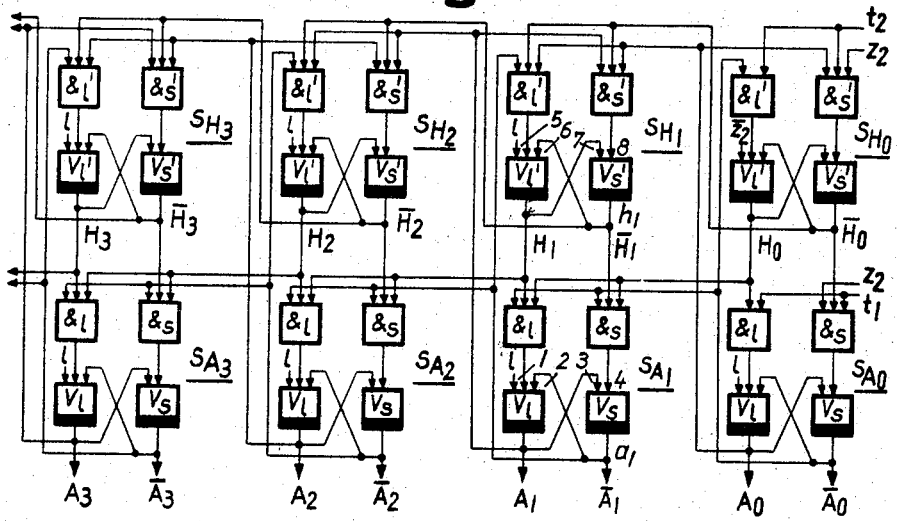
FIGURE 3 is a schematic circuit diagram showing another embodiment of a forward counting counter according to the present invention.

FIGURE 3 is a schematic circuit diagram of a modified counter in accordance with the present invention, the same also being a forward counting binary counter and operating in accordance with the same time plots as described in conjunction with the counter of FIGURE 1, i.e., the time plot shown in FIGURES 2a and 2c. Each counter stage again comprises main and auxiliary stores $S_A$ and $S_H$, which, however differ from the stores of the counter of FIGURE 1 in that the stores of the counter of FIGURE 3 each have but one input setting stage $\&_s$, $\&_s'$, and one input erase stage $\&_L$, $\&_L'$.

When all of the input signals of such a setting stage $\&_s$ are L, the output signals thereof are likewise L. Consequently, the output signal of the respective OR/NOT-stage $v_s$ is 0. Since one of the inputs of the setting stage $\&_s$ has applied to it the output signal $\overline{H}$ of the respective auxiliary store, this signal, too, has to be L.

The output signal H of the same auxiliary store must thus also be 0. This signal 0 is applied to the AND-circuit $\&_L$ which is identified as an erasing stage. Consequently, there will appear at the output of this stage $\&_L$ another signal 0. All of the input signals of the respective OR/NOT-circuit $v_L$ will be 0 (assuming that the erase signal L is also equal to 0), as a result of which the output signal of the OR/NOT-circuit $v_L$ is L. This signal L is fed back to the OR/NOT-circuit $v_s$. The output of this stage $v_s$ was already 0, due to the setting thereof, and this signal at the output of OR/NOT-circuit $v_s$ remains at 0 in view of the signal L applied from the output of the OR/NOT-circuit $v_L$. This signal 0 is applied to the OR/NOT-circuit $v_L$. So long as the signal at the output of AND-circuit $\&_L$ and the erase signal are 0, the output signal of the OR/NOT-circuit $v_L$ will be L, and becomes 0 only when all of the input signals applied to the AND-circuit $\&_L$ are L or when the erase signal L becomes equal to L. Thus, this holding condition is interrupted when all of the input signals applied to the AND-circuit $\&_L$ (this being the erase stage) are L.

The setting by the AND-circuit $\&_s$ and the erasing by the AND-circuit & takes place in an analogous manner in the case of the auxiliary store $S_H$.

It will now be shown, with reference to the stage representing the binary digit $2^1$, that the outputs A and $\overline{A}$ will always be antivalent. The analysis is carried out at the main store $S_{A1}$ of the binary digit $2^1$. The output of the OR/NOT-circuit $v_s$ is referenced $a_1$, and it will be shown that $a_1$ is always antivalent with respect to $A_1$.

Let it be assumed that the output $A_1$ is L. This means that the input signals of the OR/NOT-circuit $v_L$ are 0, including the signal in line 2. In that case, however, the signal $a_1$ will also be equal to 0 and hence antivalent to $A_1$.

If, conversely, the signal at output $A_1$ is 0, at least one of the inputs of the OR/NOT-circuit $v_L$ has to have a signal L applied to it. If the input via line 2 is at L, the signal $a_1$ is at L, so that the antivalence is again proven. Assuming next that it is the input via line 1 which is at L, then all inputs of the AND-circuit $\&_L$ have to be at L, including the output signal $H_1$, so that the input line 7 of the OR/NOT-circuit $v_s'$ has to have the signal L applied to it, as a result of which the output $h_1$ is 0. This last-mentioned signal is applied to the AND-circuit $\&_s$, whose output signal is therefore 0, as is the signal applied to the input line 4 of the OR/NOT-circuit $v_s$ (the input 3 is 0, since it was assumed that $A_1=0$) and the signal at output $a_1$ is therefore L, and is thus in this case, too, antivalent to the signal $A_1$.

The forward counting counter of FIGURE 3 operates in accordance with the following logic functions:

$$\overline{(t_1\&\overline{H}_0\&z_2)vA_0}v\overline{(t_1\&H_0)vL}=A_0$$

$$\overline{(t_2\&A_0\&z_2)vH_0}v\overline{(t_2\&\overline{A}_0)vL}=H_0$$

for $i=1, 2, 3, \ldots$ $$\overline{(\overline{A}_{i-1}\&H_{i-1}\&\overline{H}_i}vA_iv\overline{(\overline{A}_{i-1}\&H_{i-1}\&H_i)vL}=A_i$$

$$\overline{(\overline{H}_{i-1}\&A_{i-1}\&A_i)vH_i}v\overline{(\overline{H}_{i-1}\&A_{i-1}\&\overline{A}_i)vL}=H_i$$

Figure 4:
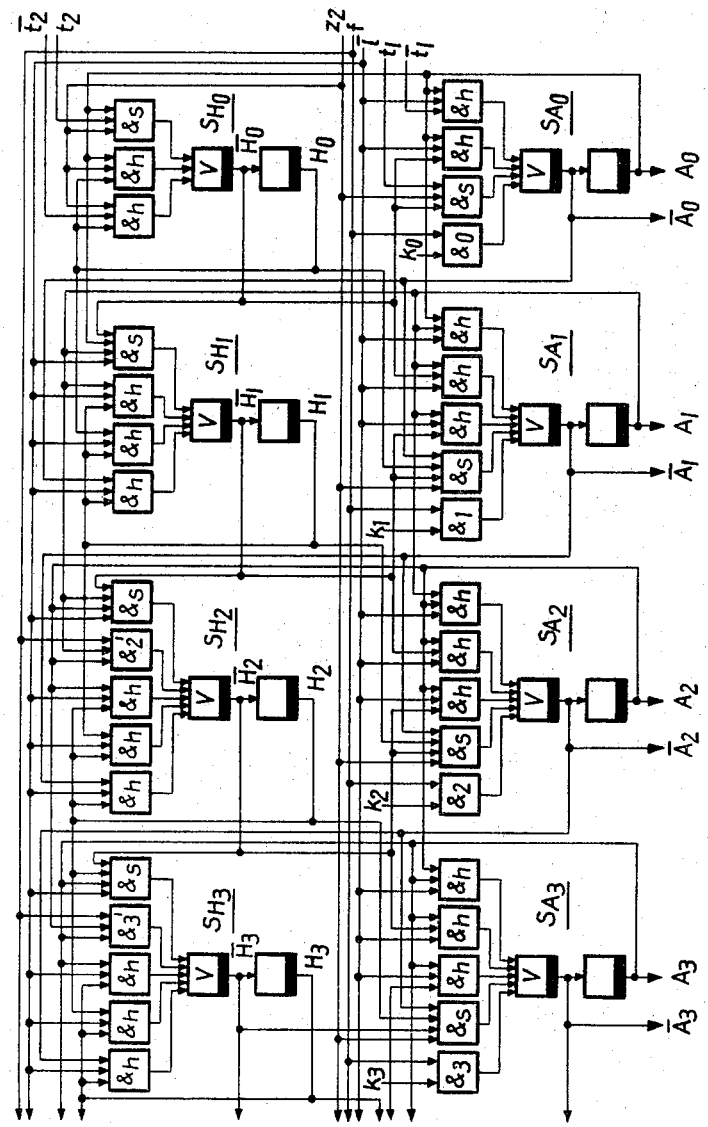
FIGURE 4 is a schematic circuit diagram showing a presettable counter according to the instant invention.

FIGURE 4 is a schematic circuit diagram of a forward counting counter which is provided with means by which the counter can be preset. The counter is provided with inputs at the main and auxiliary stores which allow the erase signal to be applied. It should be noted that these inputs are not absolutely essential if the counter is to be used under conditions where there is no need rapidly to erase, i.e., to reset, the counter. In practice, however, it is often required, in the case of a presettable counter, that an erase signal be triggered after the counter has reached a predetermined count, which erase signal is to erase the counter as quickly as possible. The presetting takes place via respective AND-circuits $\&_0$, $\&_1$, $\&_2$, $\&_3$, forming part of the respective main stores. These AND-circuits have a respective presetting signal $k$ and a common clear-for-presetting signal $f$ applied to them. The counter further includes, with each auxiliary store beginning with store $S_{H2}$, an AND-circuit $\&_2'$, $\&_3'$, which also serve for presetting, these last-mentioned AND-circuits being needed in order that the auxiliary stores assume the state which they would have assumed had the counter started to count from zero up to the value to which the counter is preset. This result is brought about because these AND-circuits &' are controlled by the outputs of the main stores.

The counter of FIGURE 4 operates in accordance with logic functions basically similar to those of the counter of FIGURE 1 but supplemented as follows:

$$\ldots\ldots\ldots\ldots v(f\&k_0)=A_0$$
$$(\overline{A}_0\&H_0\&\overline{H}_1\&z_2)\ldots\ldots v(f\&k_1)=A_1$$
$$(\overline{A}_1\&H_1\&\overline{H}_2\&z_2)\ldots\ldots v(f\&k_2)=A_2$$
$$(\overline{A}_2\&H_2\&\overline{H}_3\&z_2)\ldots\ldots v(f\&k_3)=A_3$$
$$\ldots\ldots\ldots\ldots v(A_1\&A_0\&f)=H_1$$
$$\ldots\ldots\ldots\ldots v(A_2\&A_1\&f)=H_2$$
$$\ldots\ldots\ldots\ldots v(A_3\&A_2\&f)=H_3$$

The dotted lines mean that the remaining setting and holding conditions of the counter of FIGURE 1 remain unchanged. It will thus be seen that the counter of FIGURE 4 differs from that of FIGURE 1 in that the counter of FIGURE 1 includes the additional element $(f\&k)$, and that the clear-for-counting signal $z_2$ is included in the setting condition for all of the main stores. Also, the auxiliary stores, except the lowest-order one, have an additional holding condition. While this holding condition may be dispensed with in the case of the digit $2^1$, it is needed for all binary digits beginning with $2^2$.

Figure 5:
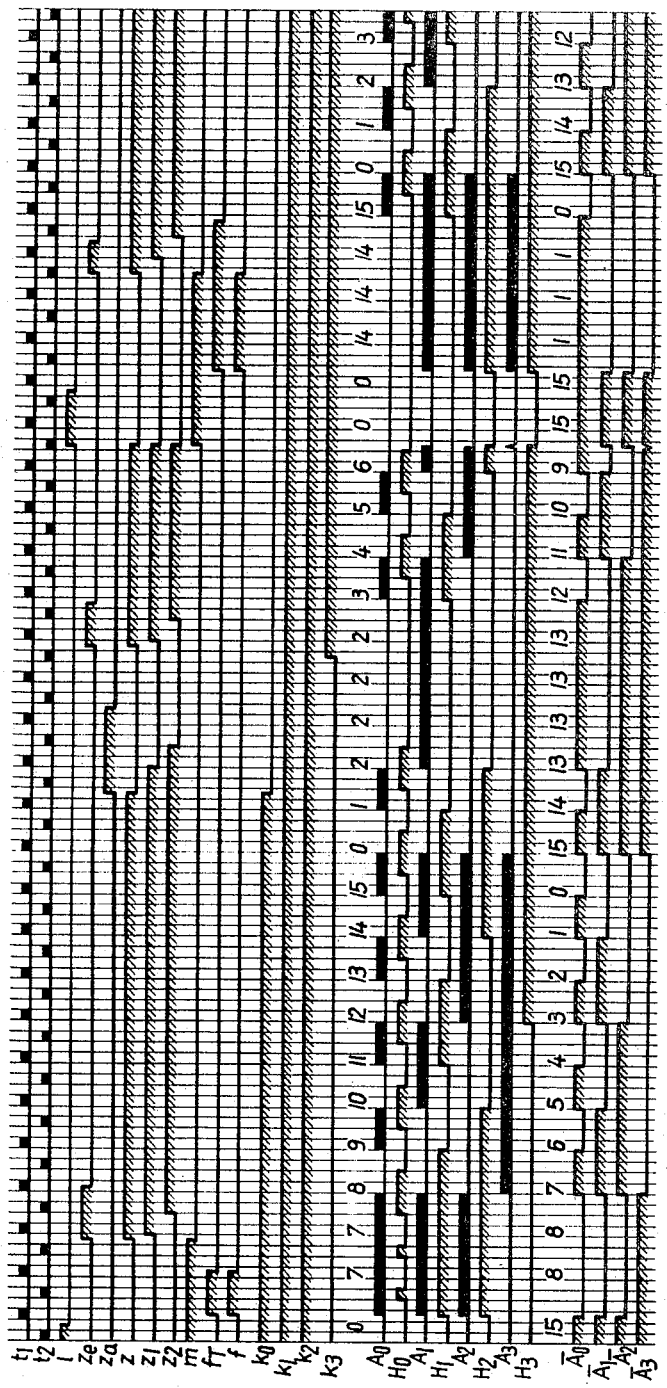
FIGURE 5 is a time plot showing the operation of the presettable counter of FIGURE 4.

FIGURE 5 is a time plot showing the operation of the presettable counter of FIGURE 4. Here it is assumed that the counting command signal $z$ is formed in a store which is set by a signal $z_e$ and erased by a signal $z_a$, which signals $z_e$ and $z_a$ may, for example, be produced by means of a suitable keying device. The signal $f$ appears after the erasing and prior to the start of the counting operation. This can be done, for instance, in such a way that a signal $m$ is set in a store by means of the erase signal L and is erased by the appearance of the signal $z$. Within the time interval during which the signal $m$ appears, after, however, the signal L has itself been erased, the signal $f$ can appear, for example, by the actuation of a separate key which produces the signal $f_T$. The A-signals are then produced by the presetting setting stages of the main stores, and the presetting setting stages of the auxiliary stores see to it that the H-signals will be such that, upon the appearance of the first $t_1$-signal that follows the appearance of the clear-for-counting signal $z_2 = L$, the counter continues to count from the count to which it has been preset. The lower part of the time plot of FIGURE 5 also shows the $\overline{A}$-signals put out by the main stores, these last-mentioned signals representing a backward counting operation, in which the countdown is begun from a number C. This number C is the difference between the highest number the counter can assume and the number to which the counter has been preset.

Figure 6:
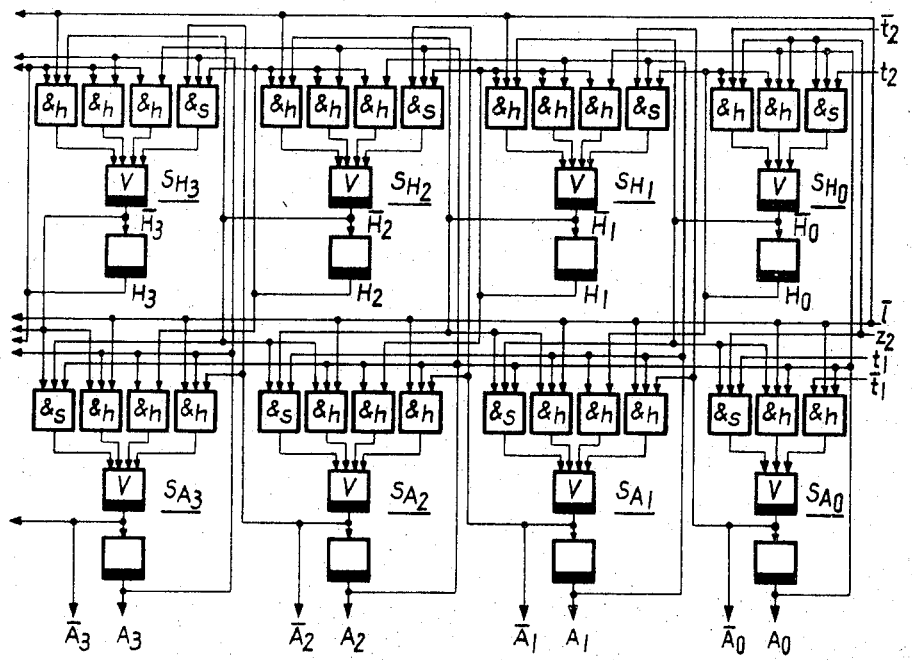
FIGURE 6 is a schematic circuit diagram showing a backward counting counter according to the present invention.

FIGURE 6 shows a four-digit binary counter which counts backward, the output of the counter appearing at the A-outputs of the main stores. The lowest-order stage $2^0$ again comprises a main store and an auxiliary store, each of which has one input setting stage $\&_s$ and two input holding stages $\&_h$. The main stores and auxiliary stores of the other binary digits each have one input setting stage $\&_s$ and three input holding stages $\&_h$. A comparison between the counters of FIGURES 1 and 6 will show that each comprises the same number of components.

The backward counting counter of FIGURE 6 operates in accordance with the following logic functions:

$$(t_1 \& \overline{H}_0 \& z_2) v (A_0 \& \overline{H}_0 \& \overline{L}) v (A_0 \& \overline{t}_1 \& \overline{L}) = A_0$$

$$(t_2 \& A_0 \& z_2) v (H_0 \& A_0 \& z_2) v (H_0 \& \overline{t}_2 \& z_2) = H_0$$

for $i = 1, 2, 3, \ldots$ $$(A_{i-1} \& \overline{H}_{i-1} \& \overline{H}_i) v (A_i \& \overline{H}_i \& \overline{L}) v (A_i \& H_{i-1})$$
$$v (A_i \& \overline{A}_{i-1} \& \overline{L}) = A_i$$

$$(\overline{A}_{i-1} \& H_{i-1} \& A_i) v (H_i \& A_i) v (H_i \& \overline{H}_{i-1} \& \overline{L})$$
$$v (H_i \& A_{i-1}) = H_i$$

Figure 7:
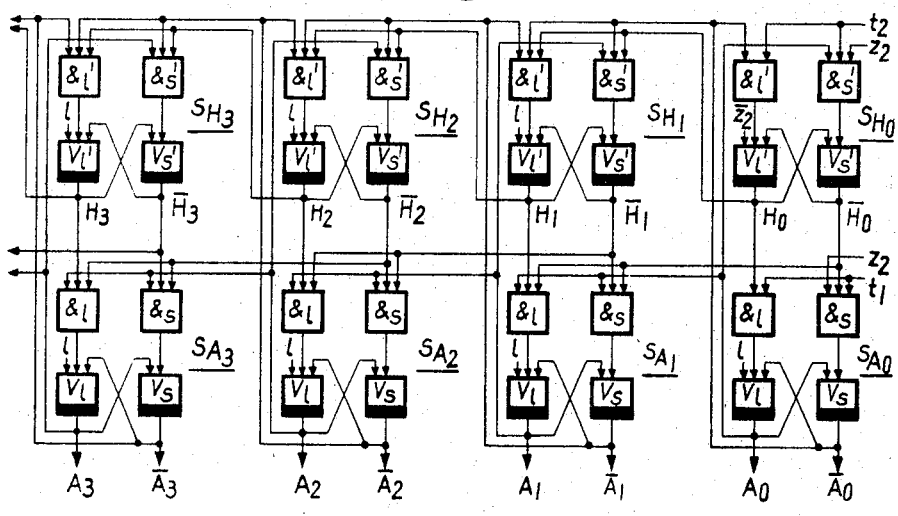
FIGURE 7 is a schematic circuit diagram of another embodiment of a backward counting counter according to the instant invention.

FIGURE 7 shows a backward counting binary counter which is modified in the same manner as the counter of FIGURE 3, and the $i^{th}$ stages, i.e., the stages other than the lowest-order stage, of the counter of FIGURE 7 have main and auxiliary stores whose logic functions are as follows:

$$L v (A_{i-1} \& H_i \& \overline{H}_{i-1}) v \overline{A_i v (A_{i-1} \& \overline{H}_i \& H_{i-1})} = A_i$$

$$L v (H_{i-1} \& \overline{A}_i \& \overline{A}_{i-1}) v \overline{H_i v (H_{i-1} \& A_i \& \overline{A}_{i-1})} = H_i$$

Figure 8:
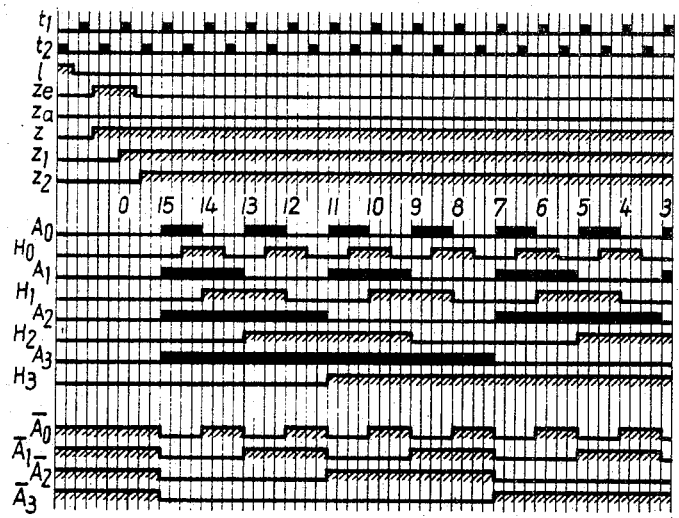
FIGURE 8 is a time plot showing the operation of the counters of FIGURES 6 and 7.

FIGURE 8 is a time plot showing the operation of two backward counting binary counters of FIGURES 6 and 7. It will be seen that here, too, the output signals H change precisely at the middle of the output signals of the respective main stores and in the middle of the time interval between two output signals of the respective main store. The lower part of FIGURE 8 shows the signals appearing at the $\overline{A}$-outputs of the main stores, which represent the forward counting operation.

Figure 9:
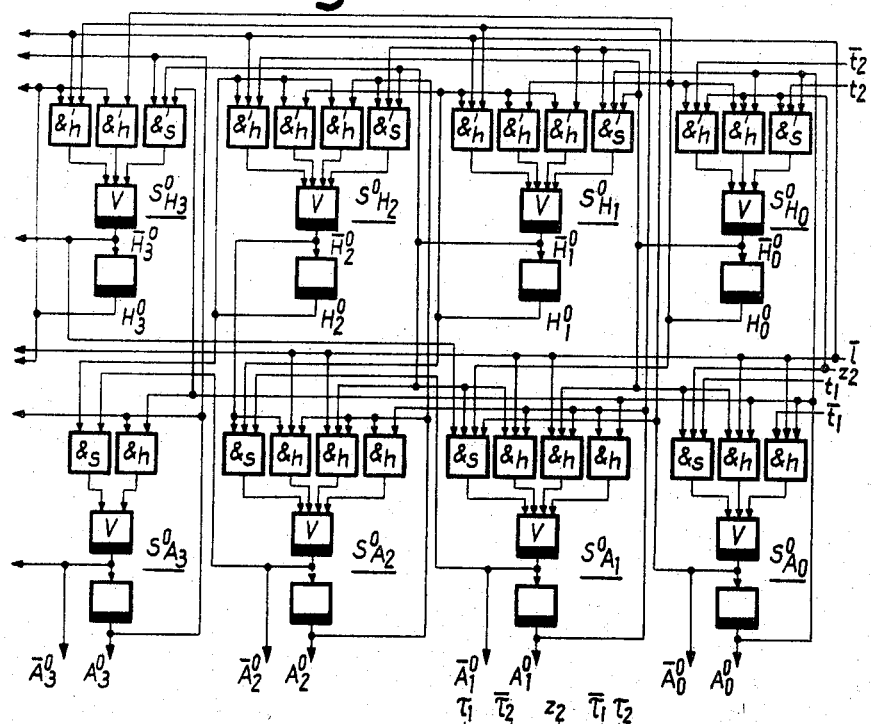
FIGURE 9 is a schematic circuit diagram of one decade of a forward counting decimal counter according to the present invention.

FIGURE 9 shows one decade of a forward counting decimal counter which is derived from the binary counter of FIGURE 1. The lowest-order counter stage remains unchanged, with the logic functions of the modified higher-order counter stages $2^1$, $2^2$, $2^3$, being as follows:

$$(\overline{A}_0^0 \& H_0^0 \& \overline{H}_1^0 \& \overline{H}_3^0) v (A_1^0 \& \overline{H}_1^0 \& \overline{L}) v$$
$$(A_1^0 \& \overline{H}_0^0 \& \overline{L}) v (A_1^0 \& A_0^0) = A_1^0$$

$$(A_1^0 \& A_0^0 \& \overline{H}_0^0) v (H_1^0 \& A_1^0) v (H_1^0 \& H_0^0) v$$
$$(H_1^0 \& \overline{A}_0^0 \& \overline{L}) = H_1^0$$

$$(\overline{A}_1^0 \& H_1^0 \& \overline{H}_2^0) v (A_2^0 \& \overline{H}_2^0 \& \overline{L}) v (A_2^0 \& \overline{H}_1^0 \& \overline{L}) v$$
$$(A_2^0 \& A_1^0) = A_2^0$$

$$(A_2^0 \& A_1^0 \& \overline{H}_1^0) v (H_2^0 \& A_2^0) v (H_2^0 \& H_1^0) v$$
$$(H_2^0 \& \overline{H}_0^0 \& \overline{L}) = H_2^0$$

$$(\overline{A}_2^0 \& H_2^0) v (A_3^0 \& A_0^0) = A_3^0$$

$$(A_3^0 \& A_0^0 \& \overline{H}_1^0) v (H_3^0 \& H_0^0) v (H_3^0 \& \overline{A}_0^0 \& \overline{L}) = H_3^0$$

Figure 10:
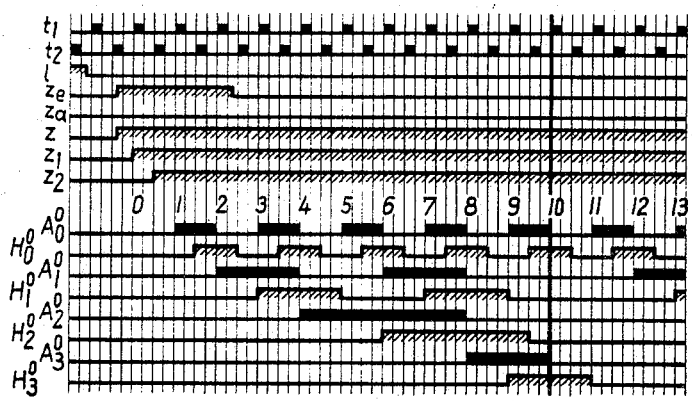
FIGURE 10 is a time plot showing the operation of the decimal counter of FIGURE 9.

FIGURE 10 is a time plot showing the operation of the decimal counter of FIGURE 9. As is apparent from the time plot, the first change of state of the H-signals (this being the appearance of the H-signals) occurs in the middle of the respective A-signals; however, due to the fact that six of the possible counts are suppressed (only ten of the possible counts of the four-digit binary stage being needed to provide one decade of the decimal counter), the second change of state, i.e., the disappearance of the H-signals of the counter stages $2^1$, $2^2$, $2^3$, does not always occur in the middle of the time interval between two A-signals of the respective main store, so that, in the case of the decimal counter, the second change of state may be considered as occurring at least generally in the middle of the time interval in question.

It will be understood that the above description of the present invention is susceptible to various modifications, changes, and adaptations, and the same are intended to be comprehended within the meaning and range of equivalents of the appended claims.

What is claimed is:

1. A static counter for counting forward or backward and controlled by counting signals and auxiliary counting signals which do not change their state simultaneously, said counter comprising, in combination:
    (a) plurality of binary counter stages each incorporating a main store and an auxiliary store which put out signals A and H, respectively, each store having input stage means; and
    (b) means interconnecting each $i^{th}$ ($i = 1, 2, 3, \ldots$) counter stage with the $(i-1)^{th}$ counter stage for causing the output signal H produced by the auxiliary store of each counter stage to change its state in the middle of the output signal A produced by the main store of the respective counter stage and in the middle of the time interval between this output signal A of said main store and the subsequent output signal A of said main store, and for causing the signals which produce the outputs of each main store and auxiliary store and which are put out by the input stage means of the respective main and auxiliary stores, to overlap each other.

2. A counter as defined in claim 1 wherein the input stage means of each main and auxiliary store of each $i^{th}$ counter stage comprises one input setting stage and three input holding stages.

3. A counter as defined in claim 1 wherein, when said counting signals and auxiliary counting signals are signals $t_1$, $t_2$, between which there is a time interval, the input stage means of the main and auxiliary stores of the $0^{th}$ counter stage each comprises one input setting stage and two input holding stages and, when said counting signals and auxiliary counting signals are signals $\tau_1$, $\tau_2$, which overlap each other, the input stage means of the main and auxiliary stores of the $0^{th}$ counter stage each comprises one input setting stage and three input holding stages.

4. A counter as defined in claim 1 wherein the input stage means of each store comprises one input setting stage and at least two input holding stages.

5. A counter as defined in claim 1 wherein the input stage means of each store comprises one input setting stage and one input erase stage having at least two inputs.

6. A counter as defined in claim 1 wherein the input stage means of each main and auxiliary store of each $i^{th}$ counter stage comprises one input setting stage and one input erase stage having three inputs.

7. A counter as defined in claim 2 wherein said main and auxiliary stores of each $i^{th}$ counter stage have the following logic functions:

$$(\overline{A}_{i-1}\&H_{i-1}\&\overline{H}_i)v(A_i\&\overline{H}_i\&L)v$$
$$(A_i\&\overline{H}_{i-1}\&\overline{L})v(A_i\&A_{i-1})=A_i$$

$$(A_i\&A_{i-1}\&\overline{H}_{i-1})v(H_i\&A_i)v$$
$$(H_i\&H_{i-1})v(H_i\&\overline{A}_{i-1}\&\overline{L})=H_i$$

8. A counter as defined in claim 3 wherein said main and auxiliary stores of said $0^{th}$ counter stage, when the counter is controlled by said signals $t_1$, $t_2$, have the following logic functions:

$$(t_1\&\overline{H}_0\&z_2)v(A_0\&\overline{H}_0\&\overline{L})v(A_0\&\overline{t}_1\&L)=A_0$$

$$(t_2\&A_0\&z_2)v(H_0\&A_0\&z_0)v(H_0\&\overline{t}_2\&z_2)=H_0$$

and, when the counter is controlled by said signals $\tau_1$, $\tau_2$, have the following logic functions:

$$(\overline{\tau}_1\&\overline{\tau}_2\&\overline{H}_0\&z_2)v(A_0\&\overline{H}_0\&\overline{L})v$$
$$(A_0\&\overline{\tau}_1\&L)v(A_0\&\tau_2\&\overline{L})=A_0$$

$$(\overline{\tau}_1\&\tau_2\&A_0\&z_2)v(H_0\&A_0\&z_2)v$$
$$(H_0\&\overline{\tau}_2\&z_2)v(H_0\&\tau_1\&z_2)=H_0$$

9. A counter as defined in claim 6 wherein said main and auxiliary stores of each $i^{th}$ counter stage have the following logic function:

$$\overline{(A_{i-1}\&H_{i-1}\&H_i)vLvA_iv\overline{(A_{i-1}\&H_{i-1}\&\overline{H}_i)}}=A_i$$

$$\overline{(\overline{H}_{i-1}\&A_{i-1}\&\overline{A}_i)vLvH_iv\overline{(H_{i-1}\&A_{i-1}\&A_i)}}=H_i$$

10. A counter as defined in claim 1, further including means for enabling the counter to be preset, said presetting means comprising:

(1) a plurality of input logic circuits connected, respectively, to all of the main stores and a plurality of further input logical circuits connected, respectively, to all of the auxiliary stores beginning with the binary digits $2^2$;

(2) means for applying a respective presetting signal to each of said input logic circuits connected to said main stores;

(3) means for applying a common clear-for-presetting signal to all of said input logic circuits connected to said main stores; and (4) means for applying the output signals of said main stores to said input logic circuits connected to said auxiliary stores for causing said auxiliary stores to assume states which they would have assumed had the counter counted from zero to the value to which the counter is preset.

11. A presettable counter as defined in claim 10 wherein said main and auxiliary stores of the $0^{th}$ and each $i^{th}$ counter stage have the following logic functions:

$$(t_1\&\overline{H}_0\&z_2)v(A_0\&\overline{H}_0\&\overline{L})v(A_0\&\overline{t}_1\&L)v(f\&k_0)=A_0$$
$$(t_2\&A_0\&z_2)v(H_0\&A_0z_2)v(H_0\&\overline{t}_2\&z_2)=H_0$$
$$(\overline{A}_{i-1}\&H_{i-1}\&\overline{H}_i\&z_2)v(A_i\&\overline{H}_i\&L)v(A_i\&\overline{H}_{i-1}\&\overline{L})$$
$$v(A_i\&A_{i-1}\&\overline{L})v(f\&k_1)=A_i$$
$$(A_i\&A_{i-1}\&\overline{H}_{i-1}\&\overline{L})v(H_i\&A_i\&\overline{L})v(H_i\&H_{i-1}\&\overline{L})$$
$$v(H_i\&\overline{A}_{i-1}\&\overline{L})v(f\&A_i\&A_{i-1})=H_i$$

12. A counter as defined in claim 1 which is a backward counting counter and wherein the main and auxiliary stores of each $i^{th}$ counter stage have the following logic function:

$$(A_{i-1}\&\overline{H}_{i-1}\&\overline{H}_i)v(A_i\&\overline{H}_i\&\overline{L})v(A_i\&H_{i-1})$$
$$v(A_i\&\overline{A}_{i-1}\&\overline{L})=A_i$$
$$(\overline{A}_{i-1}\&H_{i-1}\&A_i)v(H_i\&A_i)v(H_i\&\overline{H}_{i-1}\&\overline{L})v(H_i\&A_{i-1})=H_i$$

13. A counter as defined in claim 1 which is a backward counting counter and wherein the main and auxiliary stores of each $i^{th}$ counter stage have the following logic function:

$$\overline{Lv(A_{i-1}\&H_i\&\overline{H}_{i-1})vA_iv\overline{(A_{i-1}\&\overline{H}_i\&\overline{H}_{i-1})}}=A_i$$

$$\overline{Lv(\overline{H}_{i-1}\&A_i\&A_{i-1})v\overline{H}_iv\overline{(H_{i-1}\&A_i\&A_{i-1})}}=H_i$$

14. A static counter for counting forward or backward and controlled by counting signals and auxiliary counting signals which do not change their state simultaneously, said counter comprising, in combination:

(a) a plurality of binary counter stages each incorporating a main store and an auxiliary store which put out signals A and H, respectively, each store having input stage means, said plurality of binary counter stages being arranged to form decades which put out decimal numbers in binary coded form; and (b) means interconnecting each $i^{th}$ ($i=1, 2, 3, \ldots$) counter stage with the $(i-1)^{th}$ counter stage for causing the output signal H produced by the auxiliary store of each counter stage to change its state in the middle of the output signal A produced by the main store of the respective counter stage and at least generally in the middle of the time interval between this output signal A of said main store and the subsequent output signal A of said main store, and for causing the signals which produce the outputs of each main store and auxiliary store and which are put out by the input stage means of the respective main and auxiliary stores, to overlap each other.

15. A decimal counter as defined in claim 14, wherein the counter stages for the binary digits $2^1$, $2^2$, $2^3$ of a decade have the following logic functions:

$$(\overline{A}_0^0\&H_0^0\&\overline{H}_1^0\&\overline{H}_3^0)v(A_1^0\&\overline{H}_1^0\&\overline{L})v(A_1^0\&\overline{H}_0^0\&\overline{L})$$
$$v(A_1^0\&A_0^0)=A_1^0$$
$$(A_1^0\&A_0^0\&\overline{H}_0^0)v(H_1^0\&A_1^0)v(H_1^0\&H_0^0)v$$
$$(H_1^0\&\overline{A}_0^0\&L)=H_1^0$$
$$(\overline{A}_1^0\&H_1^0\&\overline{H}_2^0)v(A_2^0\&\overline{H}_2^0\&\overline{L})v(A_2^0\&\overline{H}_1^0\&\overline{L})$$
$$v(A_2^0\&A_1^0)=A_2^0$$
$$(A_2^0\&A_1^0\&\overline{H}_1^0)v(H_2^0\&A_2^0)v(H_2^0\&H_1^0)v$$
$$(H_2^0\&\overline{H}_0^0\&L)=H_2^0$$
$$(\overline{A}_2^0\&H_2^0)v(A_3^0\&A_0^0)=A_3^0$$
$$(A_3^0\&A_0^0\&\overline{H}_1^0)v(H_3^0\&H_0^0)v(H_3^0\&\overline{A}_0^0\&\overline{L})=H_3^0.$$

No references cited.

ARTHUR GAUSS, *Primary Examiner.*

S. D. MILLER, *Assistant Examiner.*